P. C. TIMM.
GRAIN SHOCKER.
APPLICATION FILED SEPT. 5, 1913.
1,236,018.
Patented Aug. 7, 1917.
9 SHEETS—SHEET 6.
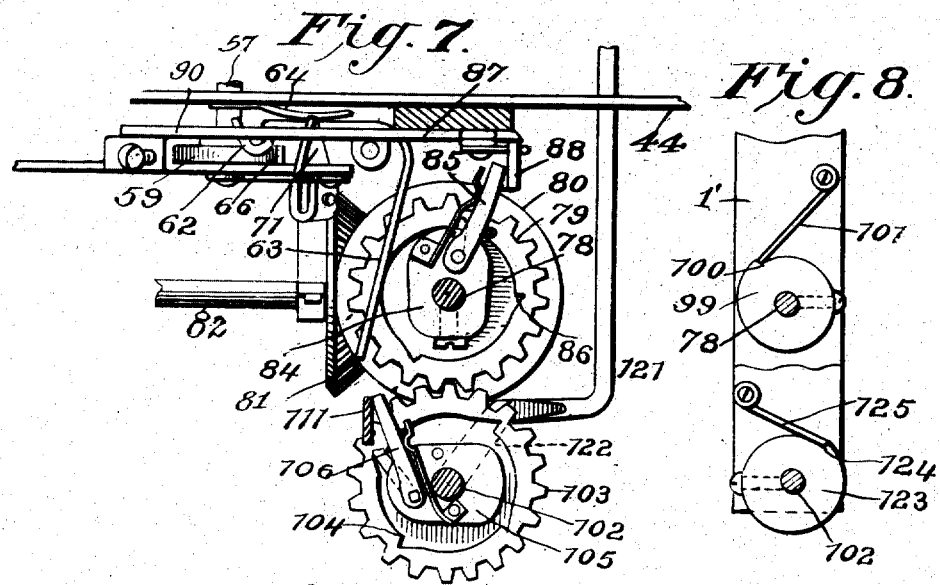
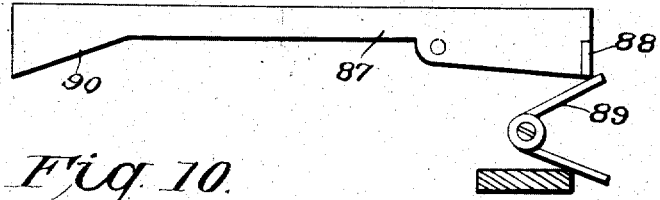
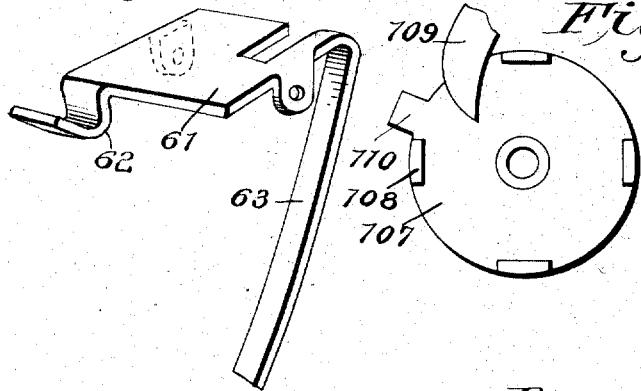
Witnesses
Jos. A. Ryan
May Barnes
Inventor
Paul C. Timm
By George W. Lues.
Attorney

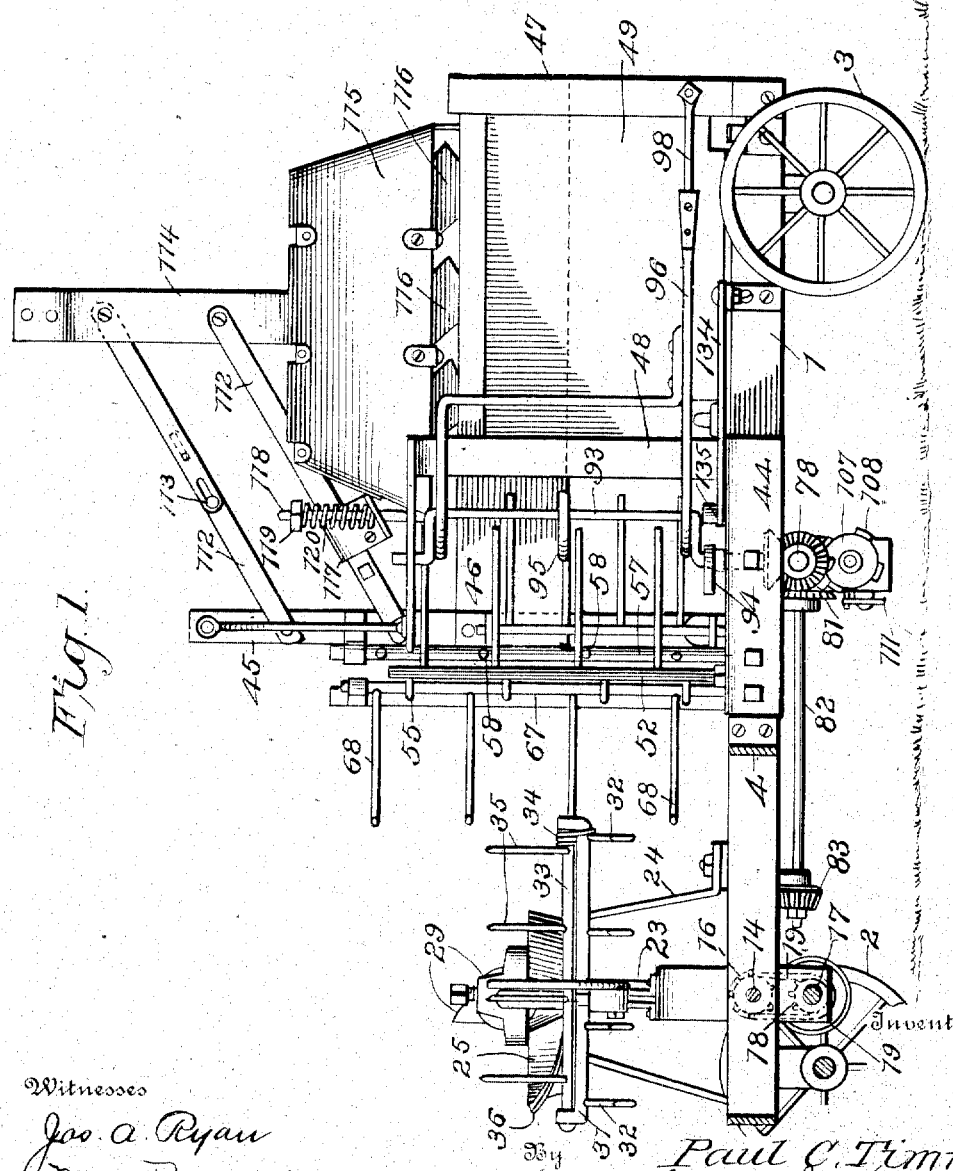

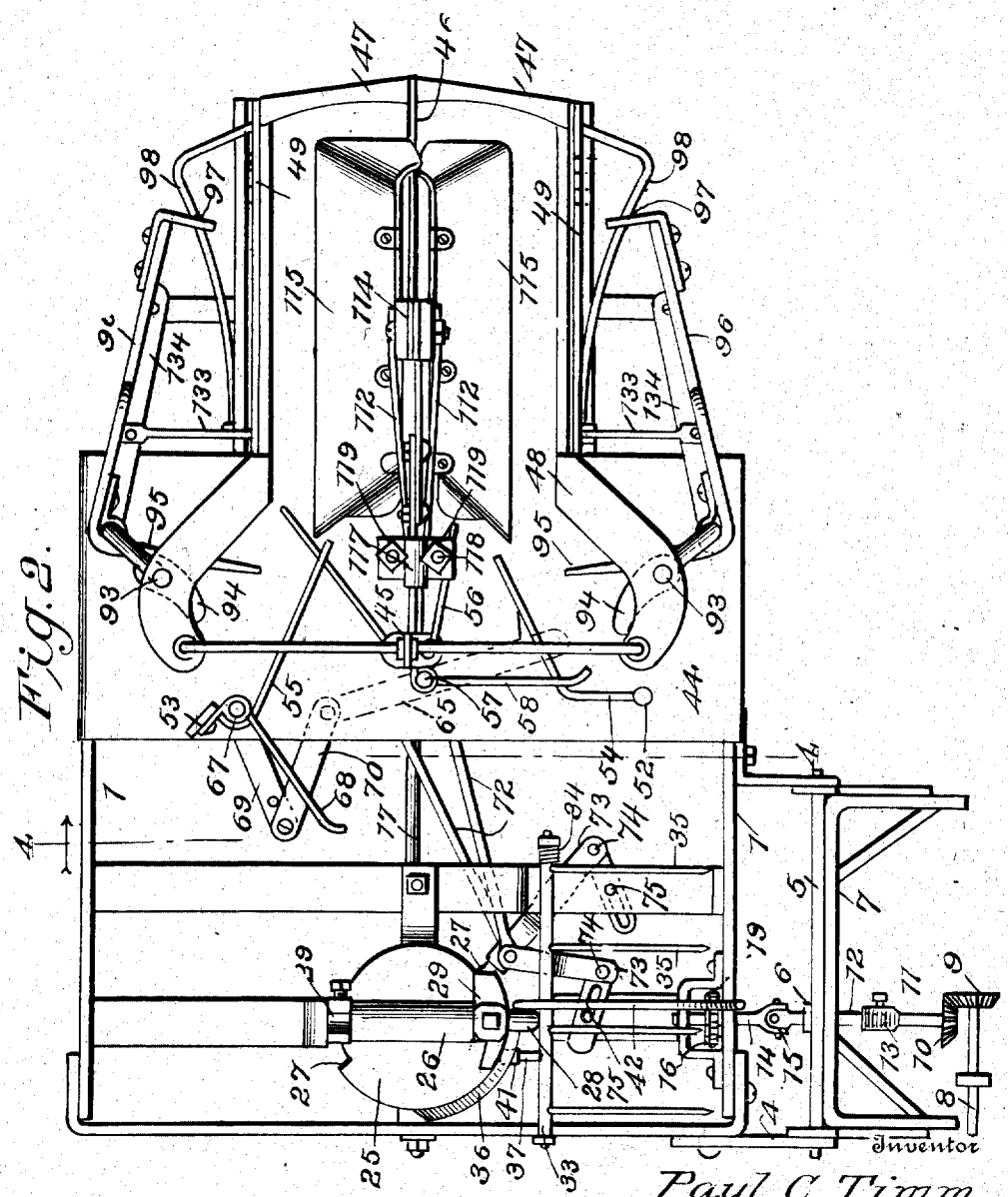

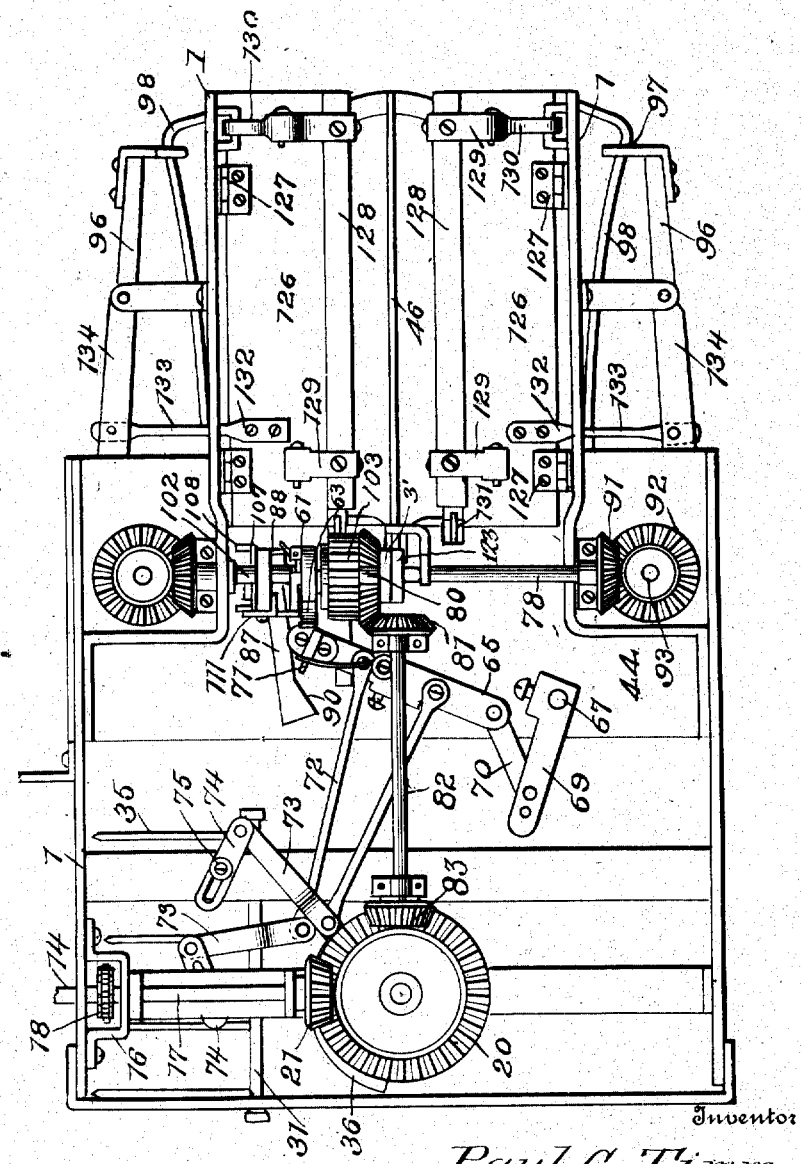

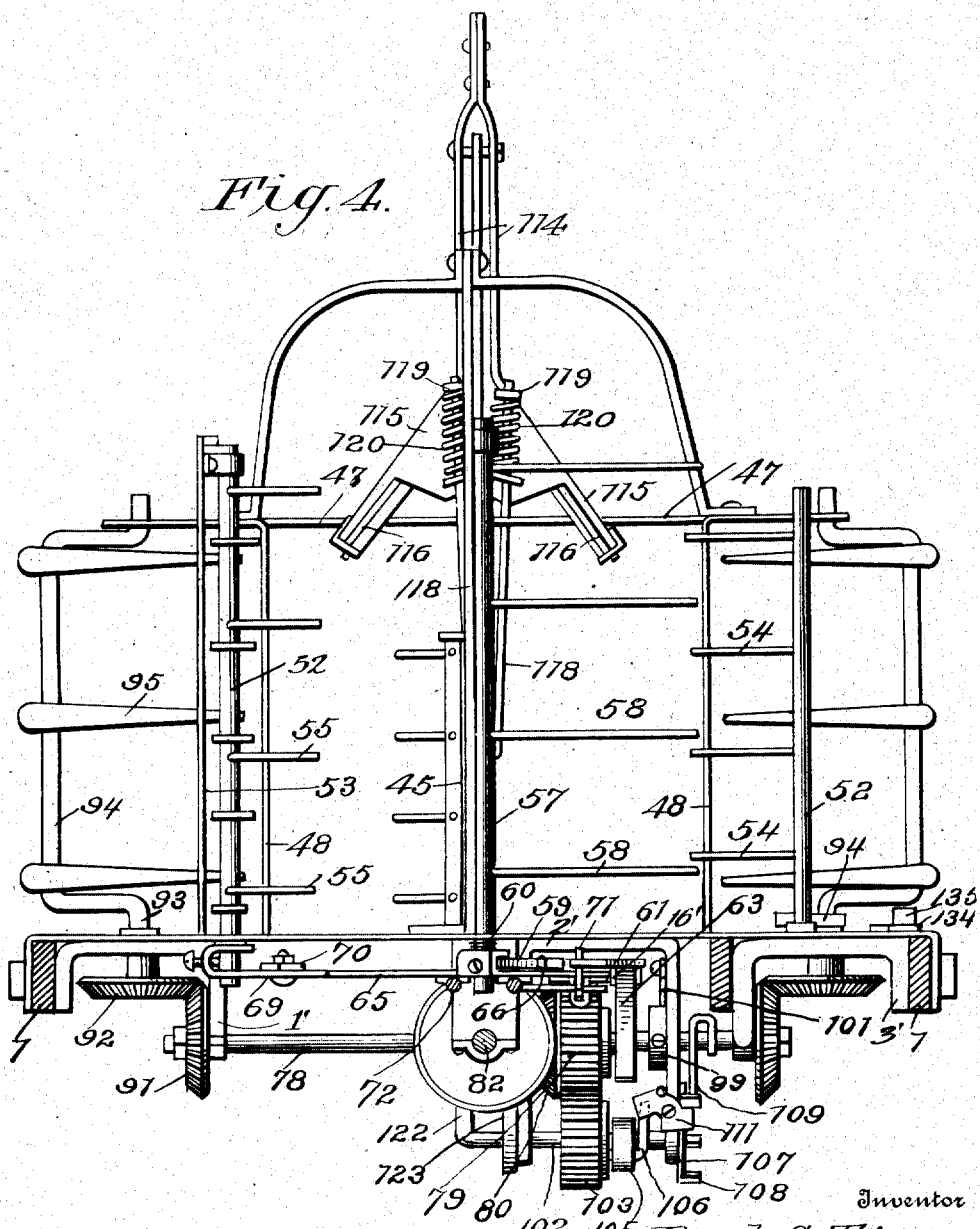

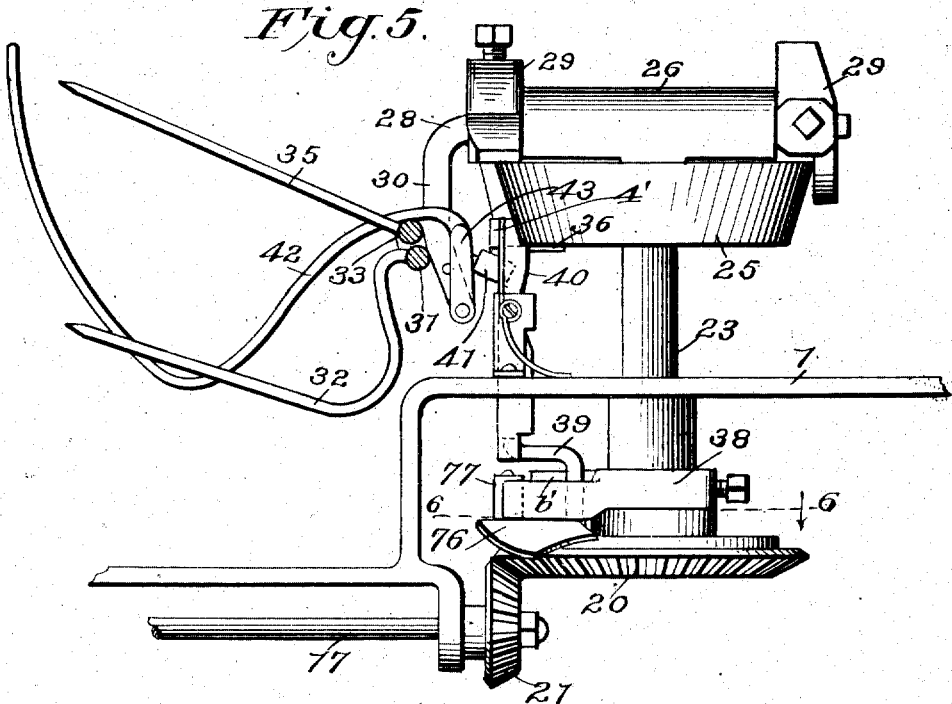

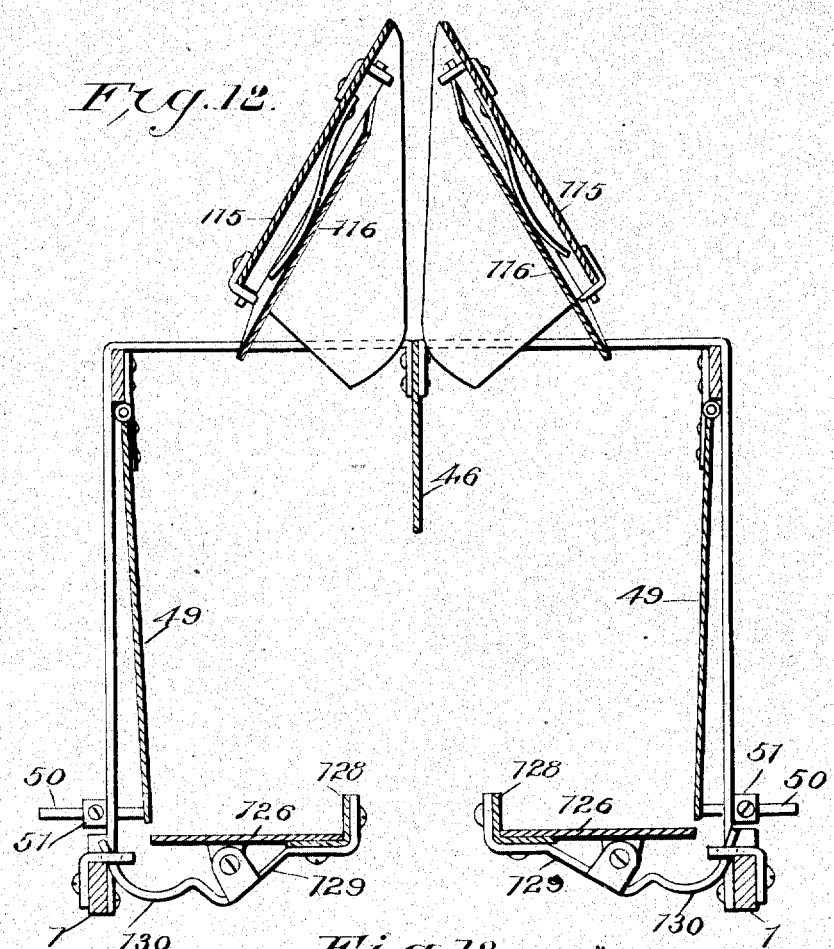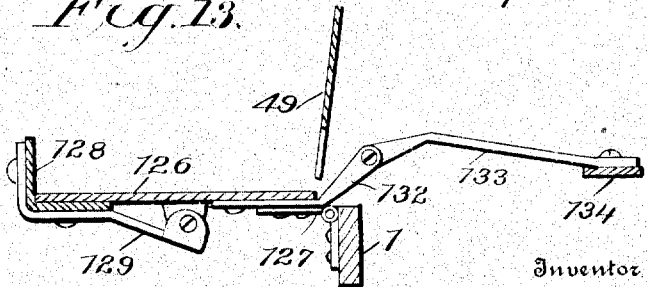

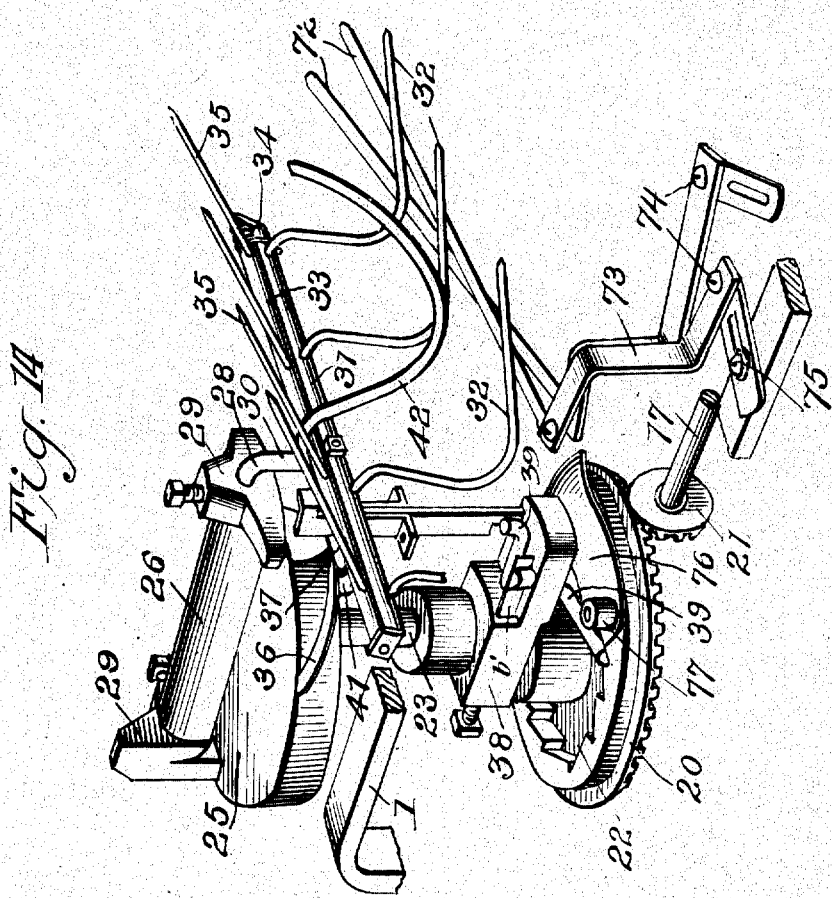

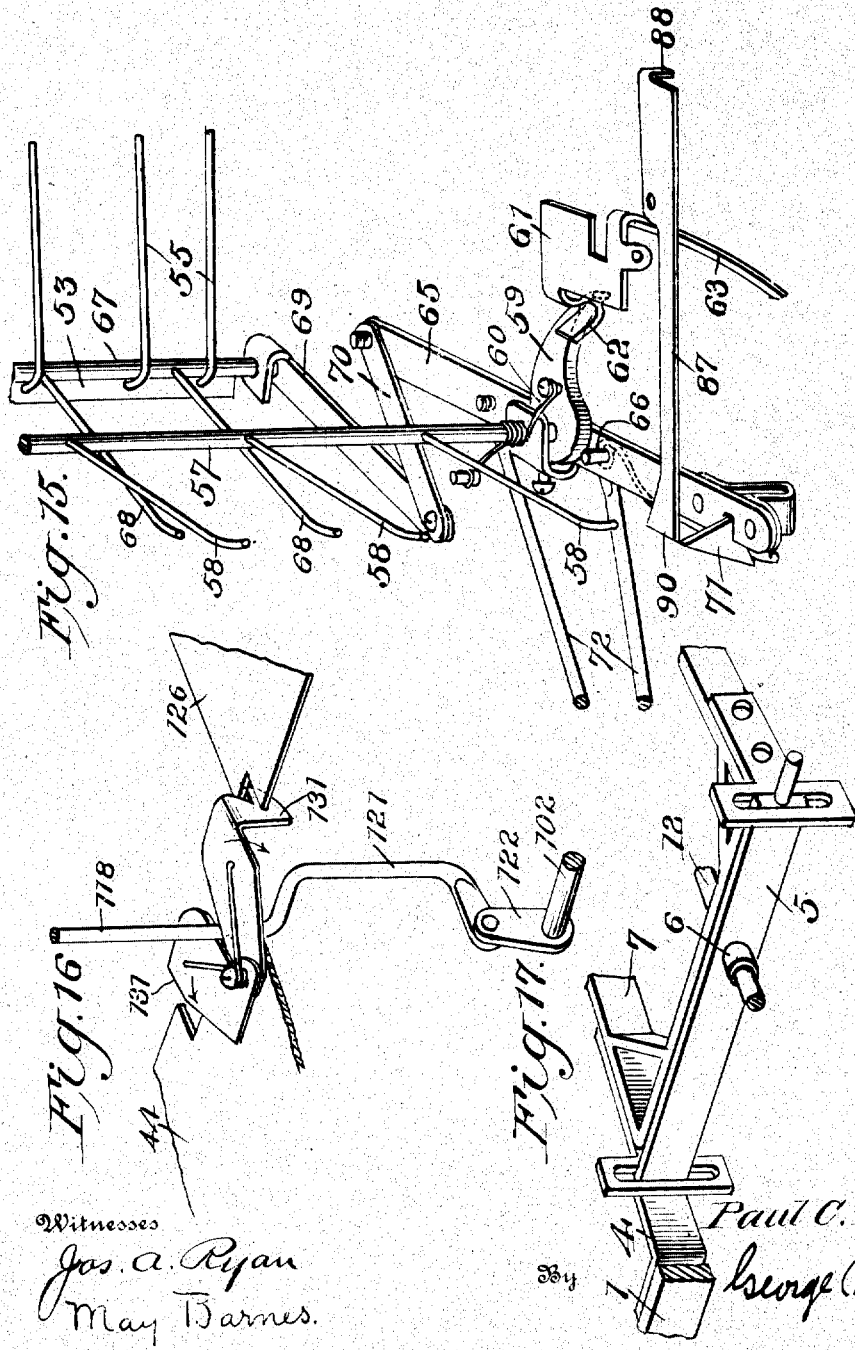

UNITED STATES PATENT OFFICE.

PAUL C. TIMM, OF OSCEOLA, NEBRASKA.

GRAIN-SHOCKER.

1,236,018.  Specification of Letters Patent.  Patented Aug. 7, 1917.

Application filed September 5, 1913. Serial No. 788,319.

*To all whom it may concern:*

Be it known that I, PAUL C. TIMM, a citizen of the United States, residing at Osceola, in the county of Polk, State of Nebraska, have invented certain new and useful Improvements in Grain-Shockers, of which the following is a specification.

This invention has relation to grain shockers, and it consists in the novel features hereinafter described and claimed.

An object of the invention is to provide a shocker in the form of an attachment adapted to be easily and quickly connected with a binder and adapted to move over a field with the same. Means is provided for operating the movable parts of the shocker from the shaft of the binder, which operates the cutting apparatus thereof. The connection between the shocker and the binder frame is such that the shocker and binder may have vertical relative movement, but the shocker is restrained against sidewise movement with relation to the binder. This vertical relative movement of the two machines is essential and necessary in order that the machines when coupled together may readily pass over uneven places at the surface of the ground.

The operation of the shocker is purely automatic, and it receives the bundles of grain successively in horizontal position from the delivery edge of the grain deck of the binder, and these bundles are turned from a horizontal to vertical position, and are passed rearwardly as the two machines move in a forward direction. The shocker is provided with a cradle which normally lies at the delivery edge of the grain deck of the binder. This cradle is arranged to rotate about a vertical axis, and may turn from a horizontal to a vertical position, a trip mechanism is mounted upon the cradle, and is engaged by the bundle which enters the same, whereby the said cradle is operatively connected with the shaft mentioned, so that the cradle is rotated about the axis of the shaft, and is turned during its rotary movement as indicated.

The shocker is provided behind the cradle with two sweeps and the said sweeps are adapted to receive the bundles from the cradle. These sweeps operate alternately so that one bundle is delivered to one sweep, and the next bundle to the other sweep. Means is provided for operating the sweeps as indicated from the shaft, which operates the cradle.

The shocker is provided behind the sweeps with two passageways, which are adapted to receive the bundles. Beyond the outer sides of these passageways are located bundle passers, which operate simultaneously against the two bundles positioned at the receiving ends of the passageways. Means is provided for operating the bundle passers at proper intervals. The passageways are separated by a vertical partition, and hinged leaves form their bottoms. Latching mechanism is provided for normally holding the hinged leaves in approximately horizontal positions. The said leaves are provided on their under sides with plates, which in turn are provided with flanges, which extend up along the inner edges of the leaves, and serve as guides for the bases of the bundles as they move rearwardly along the passageways. The said plates are movably mounted with relation to the leaves, and when the leaves swing down to open positions to release the group of bundles collected in the passageways, the edges of the plates drag against the inner edges of the butt ends of the bundles, and spread the butt ends of the two rows of bundles apart, so that two rows of bundles are deposited upon the ground in inclined positions with relation to each other whereby the completed shock is braced in its position upon the ground, and the bundles while in the shock will retain their proper relative positions. Means is provided for returning the leaves to their horizontal or normal positions, after the shocker has deposited the shock and advanced beyond the same for a considerable distance as will be more fully explained in the body of the specification.

A hood is located above the said passageways, and is provided upon its under side with fins or vanes, which may be resiliently supported or of a resilient nature. These fins or vanes are located in the paths of movement of the head ends of the bundles, and prevent the bundles from tilting or falling rearwardly as they move along the passageways in response to the action of the bundle passers. The hood is of such shape as to permit the bundles to move rearwardly along the passageways, and at the same time the heads of the two rows of bundles are held toward each other. The hood is mounted for downward and rearward movement, and means is provided for moving the hood as indicated. Means is provided for moving the hood downwardly and rearwardly when a sufficient number of bundles have been accumulated in the passageways, so that the hood follows the bundles in their descent to the ground, and rests upon the upper ends of the bundles and has a tendency to force the butt ends of the bundles in close contact with the surface of the ground whereby the shock and the bundles are securely positioned. The means for operating the hood is provided with a resilient connection with the hood in order that the downward movement of the hood may not be positive to such an extent as to loosen the grain in the event that the shock is placed upon an uneven part of the ground, or should some of the bundles be longer than others. The means for operating the hood also serves as means for operating the latches, which normally hold the leaves in horizontal or closed positions. Immediately behind the sweeps, and in advance of the receiving ends of the passageways are located spring-actuated gates, which are adapted to be encountered by the sides of the bundles as they are moved rearwardly by the sweeps toward the passageways, and these gates serve in part as guides for directing the bundles into the passageways. Furthermore the gates will serve as means for holding the straw in bunches in the event that the straw should become loose during its passage from the grain deck of the harvester to the sweeps, in case the knotter should fail to properly tie the bundle.

In the accompanying drawings:

Figure 1 is a side elevation of the shocker;

Fig. 2 is a top plan view of the same;

Fig. 3 is a bottom plan view of the same;

Fig. 4 is a transverse sectional view of the same cut on the line 4—4 of Fig. 2;

Fig. 5 is a transverse sectional view of the cradle of the shocker showing its operating parts in elevation;

Fig. 6 is a detail sectional view cut on the line 6—6 of Fig. 5;

Fig. 7 is a detail sectional view of the intermediate part of the shocker;

Fig. 8 is a detail sectional view of shaft-securing means used on the shocker;

Fig. 9 is a detail plan view of a lever used on the shocker;

Fig. 10 is a detail perspective view of a latch device used upon the shocker;

Fig. 11 is a side elevation of a timing mechanism used upon the shocker;

Fig. 12 is a transverse sectional view through the bundle passageways and the hood of the shocker;

Fig. 13 is a detail sectional view of means for returning the bottoms of the passageways of the shocker to normal position;

Fig. 14 is a perspective view of a forward portion of the shocker;

Fig. 15, is a similar view of the intermediate portion of the shocker with parts removed;

Fig. 16 is a similar view of the leaf retaining catches of the shocker;

Fig. 17 is a similar view of the specific means for connecting the shocker with the binder.

Corresponding and like parts are referred to in the following description and indicated in all the views of the drawings by the same reference characters.

The shocker comprises a frame 1 which is supported upon ground wheels 2 and 3, the ground wheel 2 being located at the forward portion of the frame and the wheel 3 at the rear portion thereof. Brackets 4 are attached to the side of the frame 1 and loosely receive the ends of a bar 5. The connection between the brackets 4 and the bar 5 is such that the frame 1 may swing vertically with relation to the bar. The bar 5 is pivotally connected at 6 with the frame 7 of the binder. A shaft 8 journaled upon the binder frame is the shaft which usually operates the cutting apparatus of the binder. A beveled pinion 9 is mounted upon the shaft 8 and meshes with a similar pinion 10 mounted upon a shaft section 11. A shaft section 12 has a slip joint connection as at 13, with the shaft section 11, and the shaft section 12 passes through the pivot 6 which connects the bar 5 with the frame 7. A shaft section 14 is journaled in the frame 1, and is connected with the shaft section 12 by means of a universal joint 15 of usual pattern. A sprocket wheel 16 is mounted upon the shaft section 14, and a shaft 17 is journaled under the frame 1. The sprocket wheel 18 is fixed to the shaft 17, and a sprocket chain 19 is trained around the sprocket wheels 16 and 18.

Therefore as the shaft 8 rotates as the binder is in operation, rotary movement is transmitted from the same through the beveled pinions 9 and 10 to the shaft sections 11 and 12, and through the universal joint 15 rotary movement is transmitted to the shaft section 14. Through the sprocket wheels and chain 19, rotary movement is transmitted from the shaft section 14 to the shaft 17. The shaft rotates continuously in the same direction.

A beveled gear wheel 20 is journaled for rotation under the frame 1 and a beveled pinion 21 carried by the shaft 17 meshes with the beveled gear wheel 20, consequently the beveled gear wheel 20 is rotated continuously in the same direction. A set of ratchet teeth 22, (best seen in Fig. 6) is mounted upon the upper side of the beveled gear wheel 20 and a stub shaft 23 forms the axis about which the wheel 20 may rotate.

Standards 24 are mounted upon the frame 1 and carry at their upper ends a table 25. The upper portion of the stub shaft 23 is journaled in the table 25 and passes transversely through the same. The shaft 23 is fixed at its upper end to a cross head 26 which rotates upon the upper surface of the table 25, and which is adapted to move around the same. The table 25 is provided at opposite side portions with shoulders 27 and a crank shaft 28 is journaled in the head 26, and is provided at the opposite ends of the head 26 with fixed shoes 29. These shoes at times are adapted to move along the edge portion of the table 25 between the shoulders 27 and the said shoes 29 have bearing surfaces which are disposed at right angles to each other. Therefore when the bearing surface of one shoe 29 lies flat against the upper side of the table 25, the bearing surface of the other shoe 29 is vertically disposed and vice versa, as is most clearly indicated in Fig. 5 of the drawing. The shaft 28 is provided with a crank portion 30 to which is attached a bar 31 carrying a number of carrying tines 32 which constitute a cradle for receiving the bundles of grain. The ends of the bar 31 are upturned as best shown in Fig. 1, and a rod 33 is journaled in the said upturned ends. A spring 34 is attached at one end to the rod 33 and bears at its other end against the bar 31. The rod 33 carries a series of holding tines 35 which are normally held toward the carrying tines 32 by the action of the spring 34, and the holding tines 35 constitute means for retaining the bundles or loose straw upon the carrying tines 32. A cam flange 36 is mounted at the edge of the table 25 and an arm 37 is fixed to the rod 33, and the lug 41 thereof is adapted to engage the cam 36 when the carrying tines 32 move to bundle-receiving position whereby the rod 33 is partially rotated, and the holding tines 35 are swung away from the carrying tines 32. An arm 38 (shown in detail in Figs. 5 and 14) is fixed to the lower portion of the shaft 23, and the arm 38 carries a spring-pressed pawl 39, which when released is adapted to engage the teeth 22 of the wheel 20 as most clearly indicated in Fig. 6. The spring b' presses against pawl 39.

A spring-pressed latch 40 is pivotally mounted upon the frame 1 under the table 25, and the lower end of the latch 40 lies in the path of movement of the upper end of the pawl 39 so that when the pawl 39 encounters the lower end of the latch 40, the pawl 39 is swung against the tension of the spring which actuates the same so that its lower end is moved within the ends of the teeth 22 or out of the path of movement of the teeth. When the carrying tines 32 are in bundle-receiving position, the lower end of the latch 40 is in the path of movement of the pawl 39, as shown in Fig. 5. The latch 40 is provided at its upper end with a lug 4', and a releasing finger 42 is pivoted to the end portion of the crank 30 of the shaft 28. The finger 42 is provided with a shoulder 43 which is adapted to encounter the lug 4' when the free end portion of the finger 42 is swung in an upward direction.

Let it be presumed that the parts are in the positions as shown in Fig. 5, and a bundle is ejected from the binder upon the carrying tines 32. At the same time the bundle passes under the finger 42 and lifts the same whereby its shoulder 43 encounters the lug 4' and the upper end of the latch 40 is pushed back against its retaining spring. This moves the lower end of the latch 40 out of the path of movement of the pawl 39, and the spring bearing against the pawl 39 turns the same so that the lower end of the pawl 39 engages one of the teeth 22 of the wheel 20, as shown in Fig. 6. Therefore the shaft 23 is caused to rotate in unison with the wheel 20. As soon as the arm 37 moves beyond the end of the cam 36, the tension of the spring 34 comes into play and the holding tines 35 are swung in a downward direction over the bundle or the straw which is deposited upon the carrying tines 32.

Approximately at the same time the bearing surface of one of the shoes 29 passes beyond one of the shoulders 27 of the head 25, and the bearing surface of the shoe 29 which is more remote from the crank portion 30 of the shaft 28, encounters the other shoulder 27 so that the shaft 28 is caused to describe one quarter of a revolution. This swings the set of carrying tines 32 from a horizontal to a vertical position, and the bundle carried by these tines, is moved accordingly. At the same time the shaft 23 continues to rotate and the bundle is moved in a rearward direction. When the bundle is behind the shaft 23, means hereinafter to be described, is provided for removing the same from between the sets of tines 32 and 35. However, the shaft 23 makes one complete rotation and as it completes its rotation the lug 41 on the end of the arm 37 engages the under side of the cam flange 36, and the rod 33 is turned whereby the holding tines 35 are moved away from the carrying tines 32. Approximately at the same time the upper end of the pawl 39 strikes the lower end of the latch 40 and thus the parts assume the positions as shown in Fig. 5, and the carrying tines 32 are ready to receive another bundle.

A platform 44 is mounted upon the intermediate portion of the frame 1, and a post 45 is erected upon the platform at a point approximately midway between the side edges thereof. A partition 46 extends rearwardly from the post 45, and is connected at its rear end with brackets 47 mounted at the rear end of the frame 1. Other brackets 48 are mounted at the intermediate portion of the frame 1 and side pieces 49 connect the brackets 47 and 48 at the same side of the frame 1 together. The side pieces 49 form the outer walls of bundle passageways and the said passageways at the opposite sides of the shocker are separated from each other by the partition 46. As best seen in Fig. 12 of the drawing, the side pieces 49 are hingedly mounted at their upper edges and carry at their lower edge portions arms 50 which pass through the brackets 48 and upon which are adjustably mounted stops 51. Therefore the side pieces 49 may have swinging movement which is limited by the positions of the stops 51 upon the arms 50. Posts 52 and 53 are mounted upon the platform 44, and carry rods 54 and 55 respectively which are rearwardly disposed toward the said passageways. Spring-pressed gates 56 are journaled at the sides of the post 45 and are normally disposed transversely across the entrances of the said passageways, although the said gates 56 may swing rearwardly as bundles are forced against their forward sides.

A shaft 57 is journaled upon the platform 44 in advance of the post 45, and carries a number of sweep arms 58. An arm 59 is fixed to the lower end of the shaft 57 below the platform 44, and a spring 60 engages the arm 59, and tends to hold the same in a forward direction. A catch member 61 shown in detail in Fig. 10, is pivoted under the platform 44, and is provided with a lug 62 which is adapted to engage the arm 59 when the same is swung rearwardly as will be explained hereinafter, and retain the same. The catch member 61 is provided with a downwardly extending portion 63, which is adapted to be encountered by a cam hereinafter to be explained whereby the member 61 is swung so that the lug 62 releases the arm 59 at proper intervals. A spring 64, (best shown in Fig. 7) is attached at one end to the platform 44, and bears against the catch member 61 to hold the lug 62 in a downward direction.

A lever 65 is pivoted upon the lower end of the shaft 57, and is provided upon its upper side with a pin 66 which is adapted to encounter the arm 59, and swing the same rearwardly so that it will be engaged with the lug 62.

A shaft 67 is journaled upon the platform 44 adjacent the post 53 and carries a series of sweep arms 68. An arm 69 is fixed to the lower end of the shaft 67, and the said arm is pivotally connected by a link 70 with one end of the lever 65. A spring-pressed pawl 71 is pivotally mounted at the other end of the said lever 65. Rods 72 are pivotally connected with the lever 65, at the opposite sides of the fulcrum point thereof, and the forward ends of the rods 72 are pivotally connected with links 73 which in turn are pivotally connected with slotted members 74 which in turn are adjustably secured to the frame 1 by means of set screws 75 which pass through their slots A cam member 76 is mounted upon the arm 38 as best shown in Figs. 6 and 14, and carries at its rear end portion a roller 77. This cam member 76 rotates with the arm 38 and is adapted to pass under the end portions of the links 73 alternately, so that the free end portions of the said links are alternately lifted into the path of movement of the roller 77. Consequently the said roller encounters the links 73 alternately and the rods 72 are moved simultaneously in opposite directions whereby the lever 65 is swung upon its pivotal connection with the lower end of the shaft 57. The movement of the lever 65 in one direction closes the arms 58 and opens the arms 68. The return movement of the lever 65 closes the arms 68, while the arms 58 remain closed, being held by the lug 62, which engages the arm 59. That is to say, when the lever 65 makes its initial swinging movement, the arms 58 are swung from an open to a closed position with relation to one of the passageways for the bundles. These arms remain in the closed position at the next swinging movement of the lever 65, which swings the arms 68 to closed position with relation to the other bundle passageway. It is to be understood that at each time the sweep arms 58 swing as indicated, they receive a bundle from the tines 32, and move the same along the platform 44 between the rods 54, and one of the gates 56. In a similar manner the next bundle that is brought around by the tines 32 is encountered by the sweep arms 68 and moved rearwardly along the platform 44 between the rods 55 and the other gate 56. Thus two bundles are positioned in the forward ends of the bundle passageways.

A shaft 78 is journaled under the platform 44 within the brackets 1', 2' and 3' and a gear wheel 79 is loosely journaled on the said shaft. A beveled pinion 80 is fixed to the side of the gear wheel 79, and meshes with a pinion 81 fixed to a shaft 82 journaled under the frame 1. A beveled pinion 83 is fixed to the forward end of the shaft 82 and meshes with the beveled gear wheel 20. Thus as the beveled gear wheel 20 rotates, rotary movement is transmitted through the pinion 83, shaft 82, and pinions 81 and 80 to the wheel 79. A cam 84 is fixed to the shaft 78 adjacent the wheel 79, and carries a spring-pressed pawl 85 which is adapted to engage teeth 86 with which the wheel 79 is provided. The pawl 85 is normally held out of engagement with the teeth 86, by a pivot latch member 87 shown in detail in Fig. 9. The said latch member is provided with a lug 88 which is adapted to engage the end of the pawl 85, and hold the pawl out of engagement with the teeth 86. A spring 89 bears against the member 87 and normally holds the lug 88 in the path of movement of the pawl 85. The member 87 is provided with an angularly disposed edge 90 which lies in the path of movement of the spring-pressed pawl 71 carried by the lever 65, and hereinbefore referred to. Therefore when the end of the lever 65 which carries the pawl 71, moves in a forward direction, the said pawl encounters the edge 90 of the latch member 87 and the said latch member is swung against the tension of the spring 89, so that the lug 88 releases the pawl 85. Therefore the spring which bears against the pawl 85 causes the pawl to engage the teeth 86 of the wheel 79, and thus the cam 84 and shaft 78 are rotated. As the cam 84 moves around it encounters the portion 63 of the catch member 61, and swings the said catch member so that the lug 62 releases the arm 59 as hereinbefore described.

Beveled pinions 91 are fixed to the ends of the shaft 78 and mesh with similar pinions 92 fixed to the lower ends of shafts 93. The shafts 93 pass through the platform 44, and are provided with cranks 94 upon which are pivoted bundle passers 95. Therefore as the shaft 78 makes a rotation as above described, rotary movement is transmitted through the beveled pinions 91 and 92, to the shafts 93 which in turn move the bundle passers 95 and the said bundle passers encounter the bundles positioned at the entrances of the bundle passageways, and move the same rearwardly along the said passageways. The bundle passers 95 are provided with shanks 96 having eyes, 97 which receive rods 98 fixed to the brackets 47 and 48. The intermediate portions of the rods 98 are curved as best shown in Fig. 2, so that the forward ends of the bundle passers 95 describe orbits as the shafts 93 rotate and this movement on the part of the bundle passers 95 moves the bundles rearwardly as described.

It is of course understood that as soon as the spring-pressed pawl 71 passes beyond the angularly disposed edge 90 of the latch member 87, that the spring 89 comes into play and moves the latch member 87 so that its lug 88 is positioned in the path of movement of the pawl 85, and consequently when the shaft 78 has made one rotation, the said pawl 85 strikes the lug 88 and the pawl becomes disengaged from the teeth 86, and the shaft 78 comes to a state of rest while the wheel 79 continues to rotate. A disk 99 is mounted upon the shaft 78, and is provided upon its periphery with a shoulder 100 which is adapted to be engaged by a pawl 101 mounted upon the frame 1 as best shown in Fig. 8, and thus the shaft 78 is held against rotating in the wrong direction. A shaft 102 is journaled below the shaft 78, and a gear wheel 103 is journaled on the shaft 102 and meshes with the gear wheel 79. The gear wheel 103 is provided at its side with teeth 104 and a block 105 is fixed to the shaft 102. The block 105 carries a spring-pressed pawl 106 which is adapted to engage the teeth 104 when the pawl 106 is released. A disk 107 is journaled upon the frame 1, and is provided at its periphery with a number of outstanding lugs 108. A finger 109 is fixed to the shaft 78, and every time the shaft 78 makes a complete revolution, the said finger 109 encounters one of the lugs 108 and causes the disk 107 to turn. Therefore, each time that the bundles are moved rearwardly in the bundle passageways, the disk 107 is partially rotated. The disk 107 also has at its periphery a radially disposed lug 110. A spring-pressed catch 111 is pivoted upon the frame 1 and normally encounters the pawl 106 to hold the same out of engagement with the teeth 104, of the wheel 103. When the lug 110 encounters the catch 111, the catch is moved to release the pawl 106, and consequently the said pawl engages the teeth 104, and the shaft 102 rotates in unison with the wheel 103.

Rearwardly disposed arms 112 are pivotally connected at their forward ends with the post 45. The uppermost arm 112 is formed in sections which are connected together by pin and slot devices indicated at 113 in Fig. 1, in order that the said arm may be extended or shortened. Bars 114 are pivotally connected with the rear ends of the arms 112 and carry at their lower ends hood sections 115. These hood sections are provided upon their under sides with resilient fins or vanes 116. These fins or vanes encounter the heads of the bundles as the bundles are moved rearwardly under the hood sections and they prevent the bundles from toppling or falling rearwardly and they hold the heads of the bundles at the opposite sides of the partition 46 toward each other.

The lowermost arm 112 is provided with a bracket 117 through which passes the end portions of rods 118. Nuts 119 are screw-threaded upon the upper ends of the rods 118 and springs 120 are interposed between the said nuts 119 and the brackets 117. The rods 118 connect at their lower ends with a rod 121 which is pivotally connected with a crank 122 provided at the end of the shaft 102. A disk 123 is fixed to the shaft 102 and is provided with a shoulder 124, and a pawl 125 is pivoted upon the frame 1, and encounters the shoulder 124 whereby the shaft 102 is held against rotating in the wrong direction. Therefore, when the shaft 102 is rotated as above indicated in the right direction, the rod 121 is moved in a downward direction by the crank 122, and the rods 118 are moved in a downward direction and through the springs 120. The arms 112 are resiliently disposed whereby the hood sections 115 are moved in a downward direction. It is of course understood that this takes place when a desired number of bundles have been assembled below the hood sections 115.

The bottoms of the bundle passageways comprise leaves 126 which are hinged as at 127, to the frame 1, as best shown in Fig. 13. These leaves are disposed below and at the opposite sides of the partition 46, and within the side pieces 49. Angle pieces 128 are mounted on arms 129 which are hinged to the under sides of the leaves 126 as shown in Figs. 12 and 13. Some of the arms 129 are provided with extensions 130 which bear against the edges of the side rails of the frame 1. Spring-pressed catches 131 are pivoted at the rear edge of the platform 44, and are adapted to engage under the free edges of the leaves 126, and hold the said leaves in uppermost or closed positions, but the initial movement of the rod 121 hereinbefore described, engages the catches 131, and moves them from under the leaves 126 so that the leaves swing down under the weight of the bundles thereon, and consequently the said leaves are moved out of the way of the bundles as the hood sections 115 follow the bundles in a downward direction. As the leaves 126 swing in a downward direction the extensions 130 of the arms 129 cause the angle pieces 128 to move under the free edges of the leaves 126, and consequently the bundles at the opposite sides of the partition 46 are spread at their bases at the time that they are lowered to the ground. Furthermore, the angle pieces 128 move out of the way of the bundles so that the leaves 126 direct the bundles in a downward direction.

Each leaf 126 is provided with an arm 132 and links 133 connect the arms 132 with levers 134 which are fulcrumed upon the frame 1. These levers have upturned ends 135 which are located in the paths of movement of the cranks 94 of the shafts 93 when the leaves 126 are swung to open positions. Therefore as the said shafts 93 are rotated in forcing the initial bundles of the next set rearward, the cranks 94 encounter the upturned ends 135 of the levers 134 and the levers are swung whereby the links 133 are moved longitudinally, and through the arms 132 the leaves are swung to the positions shown in Figs. 12 and 13, and the catches 131 automatically engage and retain the same. Thus the cycle of operation is completed.

Having thus described the invention, what is claimed is:

1. In a shocker attachment, a rotating shaft, a table, the upper end of said shaft journaled in said table, a latch pivotally secured below said table, a spring to force said latch in one direction toward the table, an arm secured to the lower end of said shaft, a pawl carried by said arm, a spring to normally force said pawl in one direction said pawl being located in the path of the lower end of said latch, a tooth provided wheel secured to said shaft, the lower end of said pawl being in normal engagement with one of said teeth, a means carried by said table for engaging the upper end of said latch, whereby said latch actuates said pawl, as, and for the purpose set forth.

2. In a shocker attachment, a shaft, a pinion secured to said shaft, a bevel gear meshing with said pinion having ratchet teeth thereon, a stub shaft supporting said gear, a table loosely held upon said shaft, and a latch, said table actuating said latch to connect and disconnect said gear.

3. In a shocker attachment, a shaft, a pinion secured to said shaft, a bevel gear meshing with said pinion having ratchet teeth thereon, a stub shaft supporting said gear, a table loosely journaled upon said shaft, an arm fixed to the lower end of said stub shaft, and a spring pressed pawl secured to said fixed arm one end adapted to engage the ratchet teeth, and means to actuate said table for releasing said pawl.

4. In a shocker attachment, a shaft, a pinion secured to said shaft, a bevel gear meshing with said pinion having ratchet teeth thereon, a stub shaft supporting said gear, a table loosely journaled upon said stub shaft having oppositely positioned shoulders, a cam flange secured to the edge of said table, an arm fixed to the lower end of said stub shaft, a spring pressed pawl secured to said fixed arm one end adapted to engage said ratchet teeth, a latch pivotally secured below said table the lower end being engaged at times by said pawl the upper end being in the path of said cam flange and a spring to force said latch in one direction.

5. In a shocker attachment, and in combination, a suitably supported table, having a cam flange, a stub shaft revolubly held within said table, a cross head secured to said shaft and rotating upon said table, a crank shaft revolubly held within said head, shoes secured to said crank shaft rotating upon said table, said shoes having bearing surfaces at a right angle to each other, a bar having crooked tines forming a cradle, a rod journaled to said bar tines secured to said rod, a spring held to said rod, an arm fixed to said rod engaging said cam flange, a finger having a shoulder adapted at times to engage said arm, as, and for the purpose set forth.

6. In a shocker attachment and in combination, a rotating head, a crank rock shaft held in said head, a bar carried at one end of said crank, a plurality of crooked carrying tines forming a cradle extending from said bar, a bundle retainer comprising a rod pivotally secured to said bar, holding tines extending from said rod, a trip mechanism actuated by a bundle comprising a spring pressed latch, a releasing finger pivoted to the end of said crank, a ratchet wheel rotating with said head, an arm rotating adjacent to said ratchet wheel, and a spring pressed pawl carried by said arm adapted to engage the teeth of said ratchet and operating in the path of said spring pressed latch, a shoulder being secured to said finger and adapted to encounter said ratchet when the free end portion of the finger is swung in an upward direction.

7. In a shocker attachment and in combination, a vertically disposed shaft, a head fixed to said shaft, a crank shaft working within said head a bar carried by said crank having crooked tines forming a cradle, a table located below said head, shoes secured at a right angle to one another to said crank shaft adapted to slide upon said table, and shoulders extending from opposite side portions of said table arranged to encounter said shoes, as and in the manner set forth.

8. In a shocker attachment and in combination, a rotating head a crank rock shaft held in said head, a bar carried at one end of said crank, a plurality of crooked carrying tines forming a cradle extending from said bar, a bundle retainer comprising a rod pivotally secured to said bar holding tines extending from said rod, a trip mechanism actuated by a bundle comprising a spring pressed latch, a releasing finger pivoted to the end of said crank, a ratchet wheel rotating with said head, an arm rotating adjacent to said ratchet wheel, and a spring pressed pawl carried by said arms adapted to engage the teeth of said ratchet and operating in the path of said spring pressed latch, a shoulder being secured to said finger and adapted to encounter said latch when the free end portion of the finger is swung in an upward direction, a table rotating below said head, shoes secured at a right angle to one another to said crank shaft and adapted to slide upon said table, and shoulders extending from opposite side portion of said table arranged to encounter said shoes as and in the manner set forth.

9. A shocker attachment comprising a frame, a cradle mounted upon the frame, means for revolving the cradle about a vertical axis, means for swinging the cradle from a horizontal to a vertical position, bundle passageways mounted upon the frame, means for removing bundles from the cradle and placing them at the receiving ends of the passageways and bundle passers for moving the bundles along the passageways.

10. A shocker attachment comprising a frame, a cradle mounted upon the frame, means for revolving the cradle about a vertical axis, means for swinging the cradle from a horizontal to a vertical position, passageways mounted upon the frame, means for removing the bundles from the cradle and placing them in front of each passageway and means for moving the bundles simultaneously along both passageways.

11. A shocker attachment comprising a frame, a cradle mounted upon the frame, means for revolving the cradle about a vertical axis, means for swinging the cradle from a horizontal to a vertical position, passageways mounted upon the frame, gates resiliently mounted at the receiving ends of the passageways, sweeps adapted to receive bundles from the cradle and move them along the gates to the passageways, and means for moving the bundles along the passageways.

12. A shocker attachment comprising a frame, a cradle mounted upon the frame, means for revolving the cradle about a vertical axis, means for swinging the cradle from a horizontal to a vertical position, passageways mounted upon the cradle, means for removing the bundles from the cradle and placing them in the passageways, means for moving the bundles along the passageways, and means for withdrawing the supports from under the bundles when a predetermined number of bundles have been assembled in the passageways.

13. A shocker attachment comprising a frame, a cradle mounted upon the frame, means for revolving the cradle about a vertical axis, means for swinging the cradle from a horizontal to a vertical position, passageways mounted upon the frame and having hinged bottoms, means for receiving the bundles from the cradle and placing them in the passageways, means for moving the bundles along the passageways, and means for releasing the bottoms of the passageways to permit the bundles to descend to the ground.

14. A shocker attachment comprising a frame, a cradle mounted upon the frame, means for revolving the cradle about a vertical axis, means for swinging the cradle from a horizontal to a vertical position, passageways mounted upon the frame, hinged leaves forming the bottoms of the passageways, resiliently supported flanges extending above the leaves when the leaves are in bundle-receiving positions, means for receiving the bundles from the cradle and for placing them in the passageways, means for moving the bundles along the passageways, means for releasing the leaves, and a resiliently operated hood adapted to press the bundles down when the leaves swing in a downward direction.

15. A shocker attachment comprising a frame, a cradle mounted upon the frame, means for revolving the cradle about a vertical axis, means for swinging the cradle from a horizontal to a vertical position, passageways mounted upon the frame and having hinged bottoms, means for receiving the bundles from the cradle and for moving them to the passageways, means for moving the bundles along the passageways, a hood located over the passageways, means for moving the hood in a downward and rearward direction, and resilient means carried by the hood and adapted to engage the tops of the bundles.

16. A shocker attachment comprising a frame, a cradle mounted upon the frame, means for revolving the cradle about a vertical axis, means for swinging the cradle from a horizontal to a vertical position, passageways carried by the frame and having hinged bottoms, means for receiving the bundles from the cradle and placing them in the passageways, means for moving the bundles along the passageways, a hood mounted above the passageways for downward and rearward movement and provided upon its under side with resilient vanes adapted to engage the heads of the bundles, means for permitting the bottoms of the passageways to swing in a downward direction, and means carried by the bottoms of the passageways for spreading the lower ends of the bundles in the adjacent passageways.

17. A shocker attachment comprising a frame, a cradle mounted upon the frame, means for revolving the cradle about a vertical axis, means for swinging the cradle from a horizontal to a vertical position, sweeps for removing bundles alternately from the cradle, passageways located behind the sweeps and adapted to receive the bundles from the sweeps, bundle passers located beyond the outer sides of the passageways and adapted to engage the bundles and move the same along the passageways, hinged leaves forming the bottoms of the passageways, a latching mechanism for holding the leaves in horizontal position, a hood located above the passageways, means for moving the hood in a downward and rearward direction, said means in its initial movement adapted to release the latching mechanism which holds the leaves.

18. A shocker attachment comprising a frame, a cradle mounted upon the frame, means for revolving the cradle about a vertical axis, means for swinging the cradle from a horizontal to a vertical position, sweeps adapted to receive bundles alternately from the cradle, passageways located behind the sweeps, said sweeps adapted to place the bundles in the passageways, means for moving the bundles along the passageways, means for releasing the bundles from the passageways and a hood mounted above the passageways and adapted to move downwardly and rearwardly when the bundles are released.

19. A shocker attachment comprising a frame, a cradle mounted upon the frame, means for revolving the cradle about a vertical axis, means for swinging the cradle from a vertical to a horizontal position, sweeps located adjacent the cradle, means for operating the sweeps alternately to cause them to remove bundles from the cradle, passageways located behind the sweeps, said sweeps adapted to place the bundles at the entrances of the passageways, means for simultaneously moving the bundles along both passageways, means for releasing the bundles from the passageways and for simultaneously spreading their butt ends, and a hood mounted above the passageways and adapted to move downwardly and rearwardly when the bundles are released.

20. A shocker attachment comprising a frame, a cradle mounted upon the frame, means for revolving the cradle about a vertical axis, means for swinging the cradle from a horizontal to a vertical position, sweeps located upon the frame, means for operating the sweeps alternately to remove bundles from the cradle, passageways located behind the sweeps and adapted to receive the bundles from the sweeps, means for moving the bundles simultaneously along the passageways, means for releasing the bundles from the passageways, a timing mechanism operatively connected with the hood to cause the same to move in a downward and rearward direction when a predetermined number of bundles have been assembled in the passageways, the means for operating the hood being adapted to operate the bundle-releasing means.

In testimony whereof I affix my signature, in the presence of two witnesses.

PAUL C. TIMM.

Witnesses:
  G. W. ENGELHARDT,
  A. J. HERRMANN.

Copies of this patent may be obtained for five cents each, by addressing the "Commissioner of Patents, Washington, D. C."